US011657005B2

(12) United States Patent
Typrowicz et al.

(10) Patent No.: US 11,657,005 B2
(45) Date of Patent: May 23, 2023

(54) SERIAL DATA COMMUNICATION BETWEEN A MASTER DEVICE AND PERIPHERAL DEVICES

(71) Applicant: Aptiv Technologies Limited, St. Michael (BB)

(72) Inventors: Wojciech Typrowicz, Dublin (IE); Markus Heinrich, Dublin (IE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/650,012

(22) Filed: Feb. 4, 2022

(65) Prior Publication Data
US 2022/0253391 A1 Aug. 11, 2022

(30) Foreign Application Priority Data
Feb. 5, 2021 (GB) .................................. 2101658

(51) Int. Cl.
*G06F 13/10* (2006.01)
*G06F 13/42* (2006.01)
(Continued)

(52) U.S. Cl.
CPC .......... *G06F 13/10* (2013.01); *G06F 13/4282* (2013.01); *G06F 2213/0002* (2013.01)

(58) Field of Classification Search
CPC ............................... G06F 13/4291; H04L 5/14
See application file for complete search history.

(56) References Cited

U.S. PATENT DOCUMENTS 5,303,227 A * 4/1994 Herold ..................... H04L 5/14
370/276
8,364,873 B2 1/2013 Chen
(Continued)

FOREIGN PATENT DOCUMENTS

CN        102929820 A       2/2013
DE     102014209625 A1     11/2015
(Continued)

OTHER PUBLICATIONS

"Search Report", GB Application No. 2101658.9, dated Nov. 4, 2021, 10 pages.
(Continued)

*Primary Examiner* — Getente A Yimer
(74) *Attorney, Agent, or Firm* — Sawtooth Patent Group PLLC

(57) ABSTRACT

A microcontroller is provided with a plurality of slave drive units for driving peripheral devices. Individual speed units are provided that have serial shift registers, multiplexors, and duplex data communication connections with individual serial registers of respective slave drive units of a series chain. In a first cycle or mode, a serial data connection between the serial shift registers of the speed units causes data to be serially communicated, at a first relatively faster pulse rate, from the microcontroller into the data input of the series chain and to the microcontroller from the data output of the series chain. In a second cycle or mode, for each pair of single speed unit and slave drive unit, the duplex data communication between the serial shift registers of the pair causes, at a second relatively slower pulse rate, data to be serially communicated in parallel therebetween.

20 Claims, 3 Drawing Sheets

(51) Int. Cl.
*G06F 13/40* (2006.01)
*H04L 5/14* (2006.01)

(56) References Cited

U.S. PATENT DOCUMENTS

| | | |
|---|---|---|
| 10,055,376 B1 | 8/2018 | Newkirk |
| 10,606,794 B1* | 3/2020 | Kollmitzer .......... G06F 13/4291 |
| 2007/0143512 A1 | 6/2007 | Kuo |
| 2011/0060856 A1 | 3/2011 | Huang et al. |
| 2013/0297829 A1 | 11/2013 | Berenbaum et al. |
| 2016/0259745 A1 | 9/2016 | Asaka et al. |
| 2019/0190561 A1* | 6/2019 | Murakami ........... G11C 7/1096 |
| 2019/0286599 A1 | 9/2019 | Lin |
| 2020/0068657 A1* | 2/2020 | Tsukamoto ............. H04W 4/80 |
| 2020/0341938 A1* | 10/2020 | Nakajima ................ G11C 8/18 |

FOREIGN PATENT DOCUMENTS

| | | |
|---|---|---|
| EP | 2645638 A1 | 10/2013 |
| WO | 2013184294 A1 | 12/2013 |

OTHER PUBLICATIONS

"Extended European Search Report", EP Application No. 22154731.8, dated Jun. 17, 2022, 6 pages.

\* cited by examiner

US 11,657,005 B2

SERIAL DATA COMMUNICATION BETWEEN A MASTER DEVICE AND PERIPHERAL DEVICES

CROSS-REFERENCE OF RELATED APPLICATIONS

This application claims priority to United Kingdom Patent Application Number 2101658.9, filed Feb. 5, 2021, the disclosure of which is hereby incorporated by reference in its entirety herein.

BACKGROUND

A serial peripheral interface (SPI) is a communication interface that is typically used for data communications between a master device of a computer and slave devices such as peripheral slave chips used in connection with peripheral devices. For example, five peripheral slave chips can be connected in parallel to a bus connected to the master device. In addition, a chip select line between the master device and each respective chip allows individual chips to be selectively enabled/disabled by the master device. If more peripheral slave devices are required, there can be a shortage of pins available for the master device and it is known to use expanders to get around this problem.

Typically, peripheral slave chips have an operation speed of 1 MHz. For example, in the automotive field, integrated circuits use smart FETs which are usually limited to a 1 MHz SPI speed. Thus, it will take 8 us to write to and read out from a standard 8-bit shift register in the peripheral chip of the peripheral device. Consequently, to transmit and receive a single 8-bit word between the master device to each of the five slave devices associated with peripheral devices would require a cycle of 40 μS.

SUMMARY

The present disclosure relates to a method and apparatus for serial data communication between a master device and a plurality of slave drive units for driving peripheral devices. Specifically, the present disclosure concerns a method and apparatus for speeding up the serial data communication between a master device and a plurality of slave drive units for driving peripheral devices so that the data communication can take place at a faster rate compared to the prior art.

According to a first aspect, there is provided a method of serial data communication between a master device (MC) and a plurality of slave drive units (DU(n)) for driving peripheral devices, wherein the slave drive units (DU(n)) include a serial shift register, the method comprising: providing an individual speed unit (SU(n)) corresponding to an individual slave drive unit (DU(n)), wherein the speed unit (SU(n)) includes a serial shift register; providing a duplex data communication connection between the serial register of individual speed units (SU(n)) and the serial register of individual corresponding slave drive units (DU(n)); providing a serial data connection between the serial registers of the speed units (SU(n)) so that they are connected in a series chain with a data input at one end of the chain and a data output at the other end of the chain; enabling, in a first cycle, the serial data connection between the serial registers of the speed units whereby data can be serially communicated, at a first relatively faster pulse rate, from the master device into the data input of the series chain and to the master device from the data output of the series chain; and enabling, in a second cycle, the duplex data communication connection between the serial register of individual speed units and the corresponding slave drive units (DU(n)) whereby data can be serially communicated in parallel therebetween at a second relatively slower pulse rate.

In one embodiment, the second cycle continues until all data in the shift registers has been shifted in the duplex data communication.

In another embodiment, the first cycle continues until all data in the serial registers of the speed units connected in the series chain has been shifted to the data output of the series chain.

In another embodiment, the first pulse rate comprises 20 MHz and the second pulse rate comprises 1 MHz.

In another embodiment, the serial shift registers are 8-bit shift registers.

In still another embodiment, the individual speed units include a further serial shift register and a further duplex data communication connection is provided between the further serial register of the individual speed units and the serial register of the additional individual corresponding slave drive units; and enabling, in a further cycle, the duplex data communication connection between the further serial shift register of individual speed units and the serial registers of the additional individual corresponding slave drive units.

According to another aspect, there is provided apparatus for providing serial data communication between a master device (MC) and a plurality of slave drive units (DU(n)) for driving peripheral devices, wherein the slave drive units (DU(n)) include a serial shift register, the apparatus comprising: a plurality of individual speed units (SU(n)), wherein the speed units (SU(n)) include a serial shift register, a multiplexor logic unit, and a duplex data communication connection for connecting the serial shift register of the individual speed unit to the serial register of a corresponding individual slave drive unit; a serial data connection between the serial registers of the speed units (SU(n)) so that they are connectable in a series chain with a data input at one end of the chain and a data output at the other end of the chain; wherein the multiplexor units of the speed units comprise logic for enabling, in a first cycle, the serial data connection between the serial shift registers of the speed units whereby data is serially communicable, at a first relatively faster pulse rate, from the master device into the data input of the series chain and to the master device from the data output of the series chain; and wherein the multiplexor unit of the speed units comprise logic for enabling, in a second cycle, the duplex data communication between the serial shift register of individual speed units and the serial shift register of the corresponding slave drive units at a second relatively slower pulse rate whereby data can be serially communicated in parallel therebetween at a second relatively slower pulse rate.

In still another embodiment, the multiplexor unit enables the second cycle to continue until all data in the shift registers has been shifted in the duplex data communication.

In still another embodiment, the multiplexor unit enables the first cycle to continue until all data in the serial registers of the speed units connected in the series chain has been shifted to the data output of the series chain.

In still another embodiment, the first pulse rate comprises 20 MHz and the second pulse rate comprises 1 MHz.

In still another embodiment, the serial shift registers are 8-bit shift registers.

In still another embodiment, the individual speed units include a further serial shift register and a further duplex data communication connection is provided between the further serial register of the individual speed units (SU(n))

and the serial register of the additional individual corresponding slave drive units; and wherein the multiplexor units of the speed units comprise logic for enabling, in a further cycle, the duplex data communication connection between the further serial shift register of individual speed units and the serial registers of the additional individual corresponding slave drive units.

In another aspect, there is provided a serial data communication system for a master device and a plurality of peripheral devices, the system comprising: a microcontroller connectable to the master device: a plurality of slave drive units (DU(n)) for driving the peripheral devices, wherein the slave drive units (DU(n)) include a serial shift register; a plurality of individual speed units (SU(n)) each corresponding to an individual slave drive unit (DU(n)), wherein the speed units (SU(n)) include a serial shift register, a multiplexor unit, and a duplex data communication connection for connecting the serial shift register of the individual speed units to the serial register of a corresponding individual slave drive unit; a serial data connection between the serial registers of the speed units so that they are connectable in a series chain with a data input at one end of the chain connected to an output of the microcontroller and a data output at the other end of the chain connected to an input of the microcontroller; wherein the multiplexor units of the speed units comprise logic for enabling, in a first cycle, the serial data connection between the serial shift registers of the speed units whereby data is serially communicable, at a first relatively faster pulse rate, from the microcontroller output into the data input of the series chain and to the input of the microcontroller from the data output of the series chain; and wherein the multiplexor units of the speed units comprise logic for enabling, in a second cycle, the duplex data communication between the serial shift register of individual speed units and the serial shift register of the corresponding slave drive units at a second relatively slower pulse rate whereby data can be serially communicated in parallel therebetween at a second relatively slower pulse rate.

In one embodiment, the individual speed units include a further serial shift register and a further duplex data communication connection is provided between the further serial register of the individual speed units (SU(n)) and the serial register of the additional individual corresponding slave drive units; and wherein the multiplexor units of the speed units comprise logic for enabling, in a further cycle, the duplex data communication connection between the further serial shift register of individual speed units and the serial registers of the additional individual corresponding slave drive units.

According to another aspect, there is provided a method of serial data communication between a master device and a plurality of slave drive units for driving peripheral devices, wherein the slave drive units include a serial shift register, the method comprising: providing an individual speed unit corresponding to an individual slave drive unit, wherein the speed unit includes a serial shift register; providing a duplex data communication connection between the serial register of individual speed units and the serial register of individual corresponding slave drive units; providing a serial data connection for each serial register of the speed units so that they are individually connectable to a data input and a data output; selecting, in a first cycle, individual speed units in a sequence and enabling the serial data connection between the serial register of the selected speed unit and the data input and data output whereby data can be serially communicated, at a first relatively faster pulse rate, from the master device into the data input and to the master device from the data output; and enabling, in a second cycle, the duplex data communication connection between the serial register of individual speed units and the corresponding slave drive units (DU(n)) whereby data can be serially communicated in parallel therebetween at a second relatively slower pulse rate.

In one embodiment, the second cycle continues until all data in the shift registers has been shifted in the duplex data communication.

In another embodiment, the first cycle continues until all data in the serial registers of the speed units has been shifted to the data output.

In still another embodiment, the first pulse rate comprises 20 MHz and the second pulse rate comprises 1 MHz.

In still another embodiment, the serial shift registers are 8-bit shift registers.

BRIEF DESCRIPTION OF DRAWINGS

Illustrative embodiments will now be described with reference to the accompanying drawings in which.

DETAILED DESCRIPTION

Figure 1:
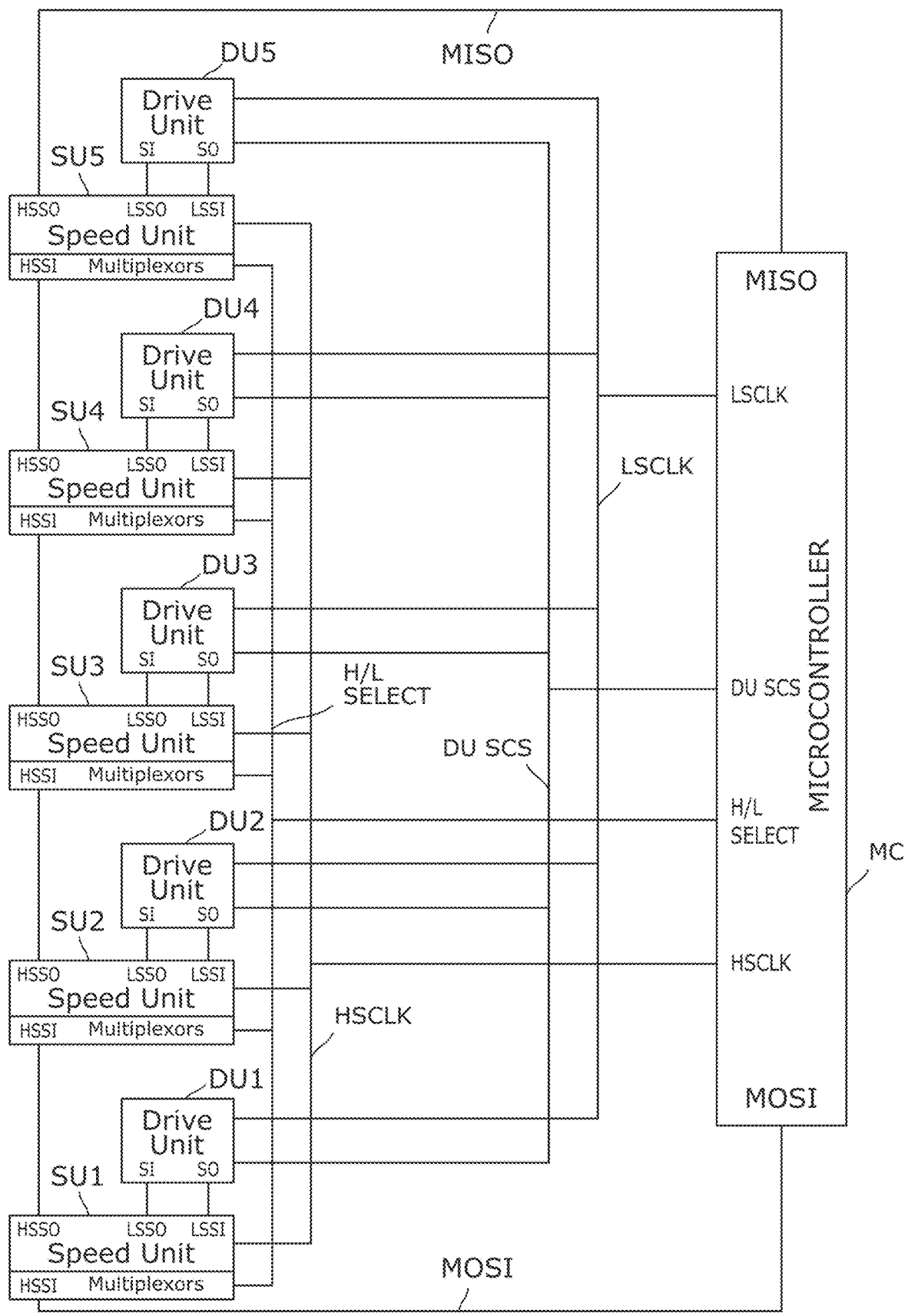
FIG. 1 illustrates an embodiment of a serial data communication system between a master device and a plurality of peripheral devices.

FIG. 1 shows an embodiment of a serial data communication system for use between a master device and a plurality of peripheral devices. A microcontroller MC is connected to a master device (not shown). It will be appreciated that the master device and microcontroller MC can be a single unit. The microcontroller MC controls the operation of the data communication between the master device and respective slave drive units DU(n) of the peripheral devices (not shown).

The microcontroller MC includes a master out slave in pin MOSI for transmitting data in serial form to a line MOSI to be sent to the peripheral devices associated with their respective slave drive units. The microcontroller MC also includes a master in slave out pin MISO for receiving data in serial form on a line MISO from the peripheral devices associated with the respective slave drive units.

Each peripheral device has a respective slave drive unit, typically an individual IC chip. In the present embodiment, the number n of slave drive units is five, DU1 to DU5, which are individually associated with a respective peripheral device although it will be apparent that a different number of peripheral devices and slave drive units can be used, typically subject to pin limitations of the microcontroller MC.

Each slave drive unit includes an 8-bit shift in/shift out shift register although the person skilled in the art will appreciate that other size shift registers can be used, for example 16 bit or 32-bit registers.

Figure 3:
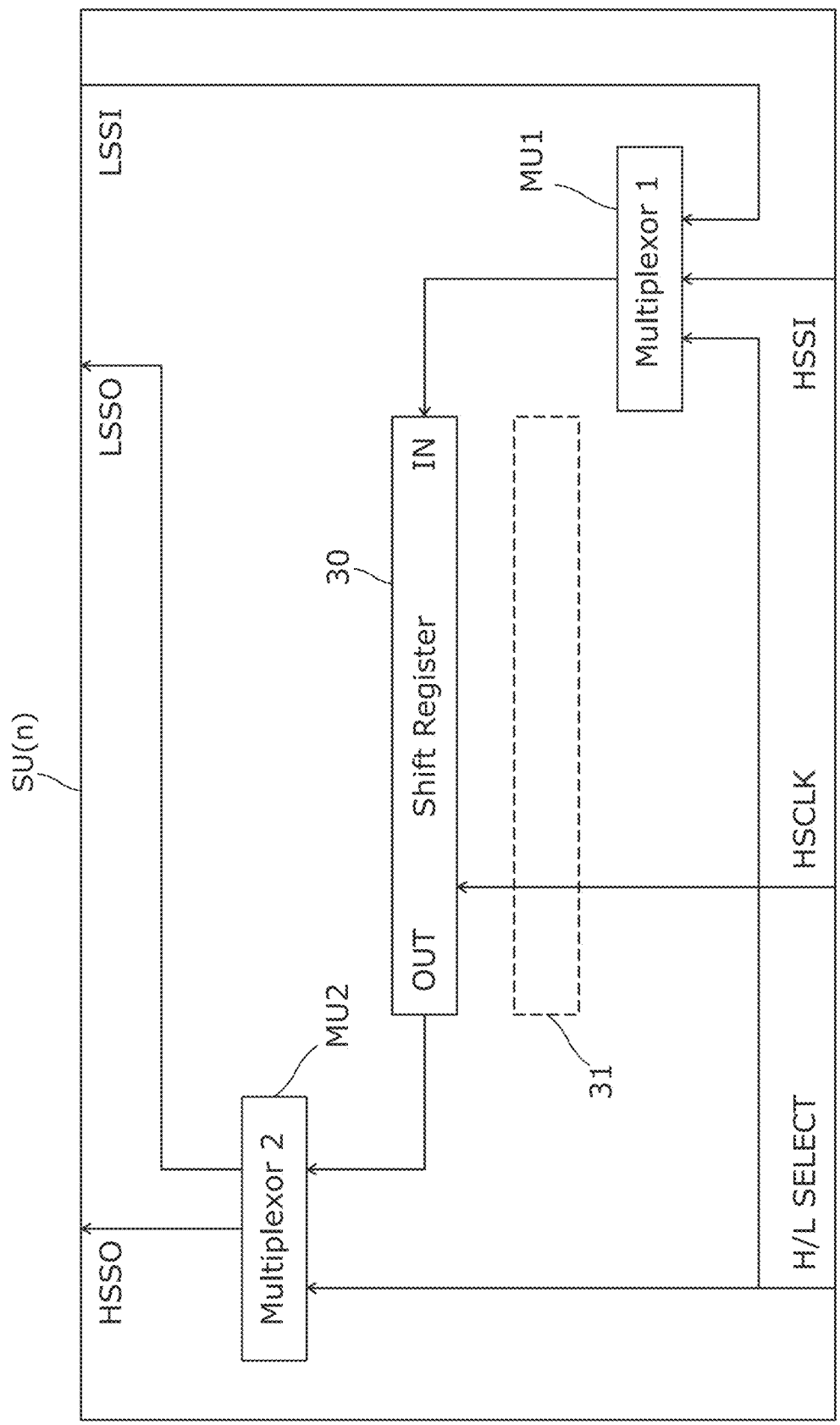
FIG. 3 illustrates an example of a speed unit for use in the embodiment of FIG. 1.

In the present embodiment, a respective speed unit SU(n) is associated with each slave drive unit to form a pair of units. FIG. 3 illustrates an example of a speed unit SU(n). The speed unit includes an 8-bit shift register 30 with an input and output although the person skilled in the art will appreciate that other size shift registers can be used, for example 16 bit or 32-bit registers.

A first multiplexor MU1 has its output connected to the input of the register 30. Multiplexor MU1 has a first input connected to a high-speed slave in pin HSSI of the speed unit and a second input connected to a low-speed slave in pin LSSI of the speed unit. A control pin of the multiplexor MU1 is connected to a high speed/low speed select pin H/L SELECT of the speed unit.

When the select pin H/L SELECT is set to high H in a first mode, the output of the multiplexor MU1 is connected to the first input connected to the high-speed slave in pin HSSI. When the select pin H/L SELECT is set to low L in a second mode, the output of the multiplexor MU1 is connected to the second input connected to the low-speed slave in pin LSSI.

A second multiplexor MU2 has its input connected to the output of the register 30. Multiplexor MU2 has a first output connected to a high-speed slave out pin HSSO of the speed unit and a second output connected to a low-speed slave out pin LSSO of the speed unit. A control pin of the multiplexor MU2 is also connected to the high speed/low speed select pin H/L SELECT of the speed unit.

When the select pin H/L SELECT is set to high H in the first mode, the input of the multiplexor MU2 is connected to the first output connected to the high-speed slave out pin HSSO. When the select pin H/L SELECT is set to low L in the second mode, the input of the multiplexor MU2 is connected to the second output connected to the low-speed slave out pin LSSO.

Each multiplexor MU1 and MU2 is connected to a high-speed clock pulse pin HSCLK of the speed unit and is connected to a low-speed clock pulse pin LSCLK of the speed unit.

Referring again to FIG. 1, five speed units SU1 to SU5 are used. Each speed unit SU(n) is connected to correspond to a respective slave drive unit DU(n).

As is known in the art, each slave drive unit DU(n) includes a pin SO for outputting of slave out data from the slave drive unit. This pin SO is connected to the low-speed slave out pin LSSO of the respective speed unit SU(n). Each slave drive unit DU(n) further includes a pin SI for inputting of slave in data from the respective speed unit SU(n). This pin SI is connected to the low-speed slave in pin LSSI of the respective speed unit SU(n).

It can be seen therefore that the individual serial shift register in each speed unit SU(n) corresponds to the serial shift register of each slave drive unit DU(n) and a respective full duplex connection between them can be established.

In the usual serial in/serial out way known to those skilled in the art, the slave drive unit can be enabled for 8 clock pulses such that each pulse causes the slave drive unit to send a bit to the speed unit and causes the speed unit to send a bit to the slave drive unit until an 8-bit word of data is exchanged. Of course, if the registers contain more than 8 bits, an appropriate number of clock pulses are used or multiples of 8 clock pulses can be used.

The microcontroller MC includes a low-speed clock pulse pin LSCLK which provides 1 MHz clock pulses to a line LSCLK. Each slave drive unit DU1 to DU5 has a clock pulse pin which is connected to the line LSCLK.

The microcontroller also includes a slave drive unit chip enable select pin DU SCS (switchable between a logic HIGH output to enable and a logic LOW to disable or vice versa) which is connected to a chip enable select line DU SCS. Each slave drive unit DU1 to DU5 has an enable pin which is connected to the line DU SCS.

Accordingly, in the present embodiment, the microcontroller MC can enable all the slave drive units DU1 to DU5 for 8 1 MHz clock pulses such that the above full duplex data communication of 8 bits of data occurs between a slave drive unit and their respective speed unit such that a word corresponding to 8 bits of data is transferred. This exchange of data enables control instructions to be sent from the master device to the peripheral device attached to the respective slave drive unit and enables return data from the peripheral device to the master device in known manner. It will be appreciated that in the present embodiment, the microcontroller MC provides an interface between the peripheral devices and the master device.

The microcontroller MC also includes a high-speed clock pulse pin HSCLK which provide 20 MHz pulses to a line HSCLK, when the pin H/L SELECT is set to high, and provide 1 MHz pulses to a line HSCLK, when H/L SELECT is set to low.

As noted above with reference to FIG. 3, each respective speed unit includes a standard 8-bit shift register and multiplexors MU1 and MU2. Each shift register has the pin HSCLK connected to the line HSCLK.

Referring again to FIG. 1, the pin HSSI of speed unit SU1 is connected by the line MOSI to the pin MOSI of the microcontroller MC.

The high-speed slave out pin HSSO of speed unit SU1 is connected to the high-speed slave input pin HSSI of speed unit SU2.

The high-speed slave out pin HSSO of speed unit SU2 is connected to the high-speed slave input pin HSSI of speed unit SU3.

The high-speed slave out pin HSSO of speed unit SU3 is connected to the high-speed slave input pin HSSI of speed unit SU4.

The high-speed slave out pin HSSO of speed unit SU4 is connected to the high-speed slave input pin HSSI of speed unit SU5.

The high-speed slave out pin HSSO of speed unit SU5 is connected by the line MISO to the pin MISO of the microcontroller MC.

The logic of the multiplexors MU1 and MU2 is arranged such that the serial shift register of each respective speed unit can, when the pin H/L SELECT is set to high in the first mode, be connected in a series chain of five serial registers with the high speed slave in pin HSSI of speed unit SU1 providing a data input at one end of the chain and the high speed slave out pin HSSO of speed unit SU5 providing a data output at the other end of the chain.

When the pin H/L SELECT is set to low in the second mode, the low speed slave output pins LSSO and the low speed input pins SI of the respective speed units and slave drive units are connected and the low speed slave input pins LSSI and the low speed output pins SO of the respective speed units and slave drive units are connected such that data can be exchanged in parallel at the same time between the shift registers of the respective individual speed units and salve drive unit pairs.

Figure 2:
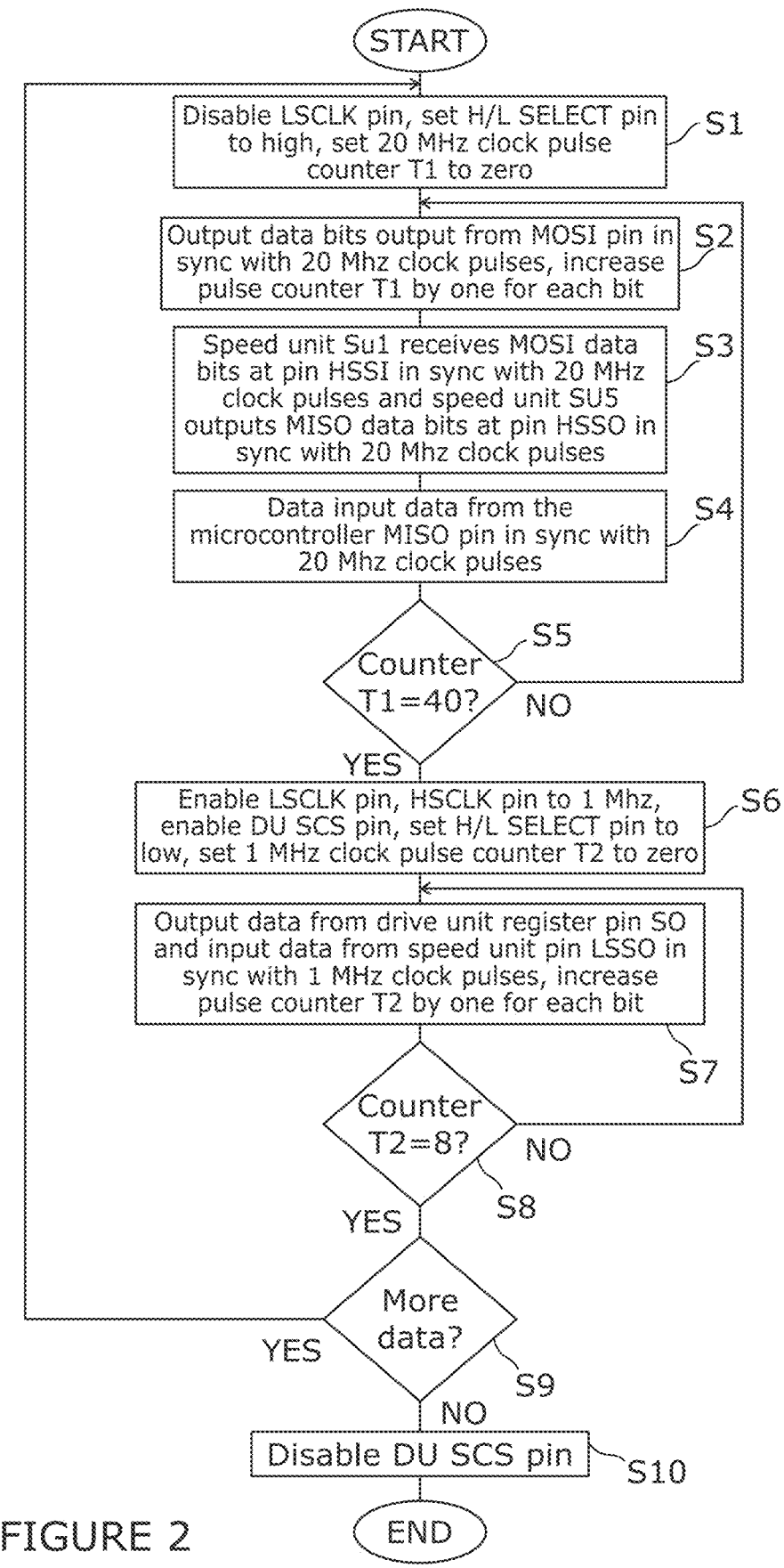
FIG. 2 illustrates a flow diagram for operating the communications system shown in FIG. 1.

The operation of the serial data communication system will now be explained with reference to the flow chart process in FIG. 2.

The microcontroller MC includes an internal counter T1 which counts clock pulses from the 20 MHz pin and an internal counter T2 which counts clock pulses from the 1 MHz pin.

In step S1, the pin LSCLK is disabled so that 1 MHz clock pulses are not sent from the pin and so can have no effect on the registers in the slave drive units D1 to D5. Consequently, the serial register in the respective speed units do not receive or send any data bits to their corresponding slave drive units in a pair so that there is no duplex data communication connection between the slave drive units and their respective speed units of a pair.

In step S1 the H/L SELECT pin is set to high. This signal is received at each multiplexer MU1 and MU2 of the speed units SU1 to SU5. Due to the logic of the multiplexors, this connects the output of their respective registers to the high-speed slave out pins HSSO and also connects bits at their high-speed slave in pins HSSI to the input of their respective speed unit register for data transmission in sync with receipt of 20 MHz clock pulse signals on the line HSCLK.

Finally, in step S1, the 20 MHz clock pulse counter T1 is set to zero.

In step S2, the microcontroller serially outputs data bits from the pin MOSI in sync with the 20 MHz timing pulse. The counter T1 is increased by one for each data bit output.

In step S3, these data bits are received at the HSSI pin of the speed unit SU1. In addition, in step S3, as is known in the art of shift in/shift out (SISO) shift registers, the data bit at the HSSI pin of speed unit S1 will be written to the input of the serial shift register in accordance with the logic of multiplexor MU1 while a data bit is output through multiplexor MU2 to the pin HSSO of the speed unit S1 in accordance with the logic of multiplexor MU2.

A corresponding effect will occur at each speed unit whereby the data bit arriving at their HSSI pin, will be written into their respective serial register while a data bit is output to their respective pin HSSO.

Consequently, as received data bits are written, data bits are output to cascade from one speed unit to the next.

Regarding speed unit SU5, the data bits are output at the HSSO pin, and in step S4 these data bits are received at the MISO pin of the microcontroller MC in sync with the 20 MHz clock pulses.

In the present embodiment, there are five speed units with an 8-bit shift in/shift out (SISO) shift register so that each register can store an 8-bit word. To replace the 40 bits in the five registers of speed units SU1 to SU5, 40 of the 20 MHz clock pulses are required. Thus, in the first mode operating at 20 MHz, a cycle of 40 clock pulses is needed to completely replace the individual 8-bit words in the five registers with the data on line MOSI and to output the individual 8 bit words on line MISO which were previously in the five registers. This cycle is therefore 2 µS long.

In step S5 it is determined whether the counter T1 has reached 40. If NO, that is the counter T1 has not reached 40, control returns to step S2. If YES, that is the counter T1 has reached 40, control proceeds to step S6.

It can therefore be seen that in steps S2 to S4, data is loaded from the line MOSI into the data input of the chain of five registers of the speed units S1 to S5 in sync with the fast clock pulses of 20 MHz and data is output to the line MISO from the data output of the chain of five registers until all five words in the five serial registers have been rewritten and their contents output.

If the counter T1 has reached 40, the process proceeds to the next step S6.

In step S6 the H/L SELECT pin is set to low. This signal is received at each multiplexor MU1 and MU2 of the speed units SU1 to SU5. Due to the logic of the multiplexors, this disconnects data output and input of their respective registers to the speed unit pins HSSO and HSSI. Instead, the output and input of their respective shift registers is connected to the LSSO pin and the LSSI of the speed unit to thereby establish the duplex data communication connection between the registers of the speed units and slave drive units.

Also in step S6 the slave drive unit pin DU SCS is set to enable and the pin LSCLK is set to emit 1 MHz clock pulse signals and the pin HSCLK is set to emit 1 MHz clock pulse signals. Because of being enabled, clock pulses arriving from the LSCLK pin result in data exchange between the registers in the slave drive units D1 to D5 to the registers of the speed units in sync with HSCLK emit 1 MHz. Consequently, when the serial register in the respective speed units receive data bits, they write data bits to their corresponding slave drive units of a pair. Thus, full duplex data communication can take place between the drive units and their respective speed units in sync with the relatively slower clock pulses of 1 MHz.

Finally, in step S6, the 1 MHz clock pulse counter T2 is set to zero.

In step S7, for each slave drive unit, their respective SISO shift register outputs a data bit at their SO pin in sync with the 1 MHZ pulse signal. The corresponding speed unit receives the data bit and their shift register inputs a data bit at their LSSI pin, also in sync with the 1 MHz pulse signal HSCLK. Similarly, for each speed unit, their respective SISO shift register outputs a data bit at their pin LSSO in sync with the 1 MHZ pulse signal. The corresponding slave drive unit receives the data bit and their shift register inputs a data bit at their SI pin, also in sync with the 1 MHz pulse signal.

In step S7, for each 1 MHz pulse signal, the value in the second timer T2 is increased by one.

In the present embodiment, the drive units have an 8-bit SISO shift register so that each register can store an 8-bit word. To replace the 8 bits in the registers of drive units DU1 to DU5, 8 of the 1 MHz clock pulses are required. Thus, in the second slow mode, a cycle of 8 clock pulses is needed to completely replace the single 8-bit word in the respective registers. This cycle is 8 µS long. It will be appreciated that the duplex data communication takes place at the same time for all the speed units and slave drive units.

In step S8 it is determined whether the counter T2 has reached 8. If NO, that is the counter T2 has not reached 8, control returns to step S7. If YES, that is the counter T2 has reached 8, control proceeds to step S9.

It can therefore be seen that in steps S7 and S8, data is loaded from the register of every respective drive unit to the register of the corresponding speed unit with the data from the register of every respective speed unit being loaded to the register of the corresponding drive unit in sync with the slow clock pulses of 1 MHz.

Consequently, to replace the 8 bits in the respective registers of all the speed units SU1 to SU5 with the 8 bits in the corresponding drive units DU1 to DU5, 8 of the 1 MHz clock pulses are required, that is 8 µS. Thus, a cycle of 8 clock pulses is needed to completely replace a single 8-bit word in all the registers.

In step S9 if it is determined that there is more data to be communicated, the process returns to step S1. If there is no further data to be communicated, the procedure proceeds to step S10. This step disables the pin DU SCS, so the drive units are disabled and then the process ends.

Consequently, with the present serial data communication system, an overall cycle of 10 µS is required to transmit and receive a single 8-bit word between the master device to each of the five slave devices associated with the peripheral devices.

By contrast, a prior art arrangement of a serial data communication system including a master device and five slave drive units associated with peripheral devices would operate by enabling a full duplex data transmission between a particular single selected slave drive unit and the master device. Assuming a 1 MHz clock signal, which is the typical operation speed of many peripheral devices in the automotive field, the data exchange of a word between the master device and a single selected slave drive unit would require 8 µS for each selected slave drive unit. Consequently, to transmit and receive a single 8-bit word between the master device and all of the five slave devices associated with peripheral devices would require an overall cycle of 40 µS.

It will be apparent that, with the present embodiment, if there are n similar slave drive units in parallel, and the corresponding paired speed units can be operated x times faster than the operation of the slave drive units, then the following holds for the speed factor:

$$(n * x)/(n + x)$$

For five slave drive units, and with the five speed units operating 20 times faster, then the present embodiment will operate four times faster than the prior art daisy chain arrangement of slave drive units.

It will be understood that the embodiments illustrated above show applications only for the purposes of illustration. In practice, embodiments may be applied to many different configurations, the detailed embodiments being straightforward for those skilled in the art to implement.

For example, although five slave drive units and five speed devices are described, different numbers of such units can be used, subject to limitations on pin availability on the chips. In addition, although the low-speed clock pulse speed is 1 MHz and the high-speed clock pulse is 20 MHz, other speeds can be used as appropriate to the components and peripheral devices that are used.

The components to achieve the logic of the multiplexors MU1 and MU2 will be readily apparent to those skilled in the art. Nevertheless, the skilled person will appreciate that the above arrangement of the multiplexors MU1 and MU2 can be changed or added to achieve the same logic of connections to implement the present serial data communication system.

It will also be appreciated that a reset pin would typically be required to reset the contents of the serial registers of the speed units and/or the drive units.

It will also be appreciated that while the microcontroller MC of the present embodiment has two clock pulse pins, the microcontroller MC could include just a single clock pulse pin with the microcontroller controlling the clock pulse speed of that single pin.

The above embodiment has five 8-bit registers in the speed units to define a chain by which data is communicated between the MOSI pin and MISO pin of the microcontroller MC by cascading the data from speed unit SU1, to speed unit SU2, speed unit SU3, speed unit SU4 and speed unit SU5.

The person skilled in the art will also appreciate that the present embodiment can be altered to apply to a different embodiment where the high-speed slave in and the high-speed slave out data can be read in and out sequentially from the registers of the individual speed units. Thus, a single speed unit is selected By incorporating a speed unit select pin on the microcontroller MC and appropriate multiplexors in the speed units and pin connections, a single speed unit can be selected so that data from the pin MOSI is read into the register at 20 MHz while data from the register is read out and written to the pin MISO at 20 MHz. This can be repeated for each speed unit so that in this mode, the 40 bits in the five registers is exchanged in 2 µS again. The details of such an embodiment will be readily apparent to those skilled in the art.

Those skilled in the art will appreciate that each speed unit can operate as a slave drive unit input or output expander by including a second 8 bit register 31 (shown in dotted outline in FIG. 3) and additional corresponding 8 input pins or output pins, which can be connected to other inputs or outputs in the system that may do not fit to the microcontroller because of the limited number of pins of the microcontroller. It will be appreciated that the microcontroller MC would require an additional pin to transfer register bits 30 to register bits 31 and different timings would be required for selection of the register 31 for high speed and low speed, the details of which would be readily apparent to the person skilled in the art.

In summary, a microcontroller (MC) is provided with a plurality of slave drive units (D1-D5) for driving peripheral devices. Individual speed units (SU1-SU5) are provided which have a serial shift register, multiplexors (MU1-MU2), and a duplex data communication connection via pins (LSSI, LSSO) with individual serial registers of a connected slave drive unit. A serial data connection via pins (HSSI, HSSO) is provided between the serial registers of the speed units to form a series chain connection with a data input at one end of the chain and a data output at the other end of the chain. The multiplexors have logic for enabling, in a first cycle or mode, the serial data connection between the serial shift registers of the speed units whereby data is serially communicated, at a first relatively faster pulse rate, from a pin (MOSI) of the microcontroller into the data input of the series chain and to a pin (MISO) of the microcontroller from the data output of the series chain. The multiplexors have logic for enabling, in a second cycle or mode for each pair of a single speed unit and a corresponding slave drive unit, the duplex data communication between the serial shift registers of the pair, at a second relatively slower pulse rate, whereby data can be serially communicated in parallel therebetween at a second relatively slower pulse rate.

What is claimed is:

1. A method of serial data communication between a master device and a plurality of slave drive units for driving peripheral devices, wherein the slave drive units include a serial shift register, the method comprising:
   providing an individual speed unit corresponding to an individual slave drive unit, wherein the individual speed unit includes a serial shift register;
   providing a duplex data communication connection between a serial register of individual speed units and a serial register of individual corresponding slave drive units;
   providing a serial data connection between the serial registers of the speed units so that they are connected in a series chain with a data input at one end of the chain and a data output at the other end of the chain;
   enabling, in a first cycle, the serial data connection between the serial registers of the speed units whereby data can be serially communicated, at a first relatively faster pulse rate, from the master device into the data input of the series chain and to the master device from the data output of the series chain; and
   enabling, in a second cycle, the duplex data communication connection between the serial register of individual speed units and the corresponding slave drive units whereby data can be serially communicated in parallel therebetween at a second relatively slower pulse rate.

2. The method as claimed in claim 1, wherein the second cycle continues until the data in the shift registers has been shifted in the duplex data communication.

3. The method as claimed in claim 1, wherein the first cycle continues until the data in the serial registers of the speed units connected in the series chain has been shifted to the data output of the series chain.

4. The method as claimed in claim 1, wherein the first pulse rate comprises 20 MHz and the second pulse rate comprises 1 MHz.

5. The method as claimed in claim 1, wherein the serial shift registers are 8-bit shift registers.

6. The method as claimed in claim 1, wherein the individual speed units include a further serial shift register and a further duplex data communication connection is provided between the further serial register of the individual speed units and a serial register of additional individual corresponding slave drive units; and
enabling, in a further cycle, the duplex data communication connection between the further serial shift register of individual speed units and the serial registers of the additional individual corresponding slave drive units.

7. An apparatus for providing serial data communication between a master device and a plurality of slave drive units for driving peripheral devices, wherein the slave drive units include a serial shift register, the apparatus comprising:
a plurality of individual speed units, wherein the speed units include a serial shift register, a multiplexor logic unit, and a duplex data communication connection for connecting the serial shift register of the individual speed unit to the serial register of a corresponding individual slave drive unit;
a serial data connection between the serial registers of the speed units so that they are connectable in a series chain with a data input at one end of the chain and a data output at the other end of the chain;
wherein the multiplexor units of the speed units comprise logic for enabling, in a first cycle, the serial data connection between the serial shift registers of the speed units whereby data is serially communicable, at a first relatively faster pulse rate, from the master device into the data input of the series chain and to the master device from the data output of the series chain; and
wherein the multiplexor units of the speed units comprise logic for enabling, in a second cycle, the duplex data communication between the serial shift register of individual speed units and the serial shift register of the corresponding slave drive units at a second relatively slower pulse rate whereby data can be serially communicated in parallel therebetween at a second relatively slower pulse rate.

8. The apparatus as claimed in claim 7, wherein the multiplexor unit enables the second cycle to continue until the data in the shift registers has been shifted in the duplex data communication.

9. The apparatus as claimed in claim 7, wherein the multiplexor unit enables the first cycle to continue until the data in the serial registers of the speed units connected in the series chain has been shifted to the data output of the series chain.

10. The apparatus as claimed in claim 7, wherein the first pulse rate comprises 20 MHz and the second pulse rate comprises 1 MHz.

11. The apparatus as claimed in claim 7, wherein the serial shift registers are 8 bit shift registers.

12. The apparatus as claimed in claim 7, wherein the individual speed units include a further serial shift register and a further duplex data communication connection is provided between the further serial register of the individual speed units and serial registers of additional individual corresponding slave drive units; and
wherein the multiplexor units of the speed units comprise logic for enabling, in a further cycle, the duplex data communication connection between the further serial shift register of individual speed units and the serial registers of the additional individual corresponding slave drive units.

13. The apparatus as claimed in claim 7, wherein the apparatus is configured to be disposed within an automobile.

14. The apparatus as claimed in claim 7, wherein the data comprises an 8-bit word.

15. A method of serial data communication between a master device and a plurality of slave drive units for driving peripheral devices, wherein the slave drive units include a serial shift register, the method comprising:
providing an individual speed unit corresponding to an individual slave drive unit, wherein the individual speed unit includes a serial shift register;
providing a duplex data communication connection between the serial register of individual speed units and the serial register of individual corresponding slave drive units;
providing a serial data connection for each serial register of the speed units so that they are individually connectable to a data input and a data output;
selecting, in a first cycle, individual speed units in a sequence and enabling the serial data connection between the serial register of the selected speed unit and the data input and data output whereby data can be serially communicated, at a first relatively faster pulse rate, from the master device into the data input and to the master device from the data output; and
enabling, in a second cycle, the duplex data communication connection between the serial register of individual speed units and the corresponding slave drive units whereby data can be serially communicated in parallel therebetween at a second relatively slower pulse rate.

16. The method as claimed in claim 15, wherein the second cycle continues until the data in the shift registers has been shifted in the duplex data communication.

17. The method as claimed in claim 15, wherein the first cycle continues until the data in the serial registers of the speed units has been shifted to the data output.

18. The method as claimed in claim 15, wherein the first pulse rate comprises 20 MHz and the second pulse rate comprises 1 MHz.

19. The method as claimed in claim 15, wherein the serial shift registers are 8-bit shift registers.

20. The method as claimed in claim 15, wherein the data comprises an 8-bit word.

* * * * *